US011042387B2

(12) United States Patent
Jose et al.

(10) Patent No.: US 11,042,387 B2
(45) Date of Patent: *Jun. 22, 2021

(54) DEPLOYING CROSS-PLATFORM APPLICATIONS ON MOBILE DEVICES WITH NATIVE AND WEB COMPONENTS

(71) Applicant: INTUIT INC., Mountain View, CA (US)

(72) Inventors: Ann Catherine Jose, Mountain View, CA (US); Jay Yu, San Diego, CA (US); Anshu Verma, Mountain View, CA (US); Eugene Krivopaltsev, Mountain View, CA (US); Patteaswaran Karivaradasamy, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,478

(22) Filed: Feb. 17, 2020

(65) Prior Publication Data
US 2020/0183710 A1  Jun. 11, 2020

Related U.S. Application Data

(63) Continuation of application No. 15/851,788, filed on Dec. 22, 2017, now Pat. No. 10,564,988.

(51) Int. Cl.
*G06F 9/445* (2018.01)
*G06F 8/65* (2018.01)
*G06F 9/54* (2006.01)
*H04L 29/08* (2006.01)

(52) U.S. Cl.
CPC ............ *G06F 9/44526* (2013.01); *G06F 8/65* (2013.01); *G06F 9/546* (2013.01); *G06F 9/547* (2013.01); *H04L 67/28* (2013.01); *H04L 67/34* (2013.01); *H04L 67/02* (2013.01)

(58) Field of Classification Search
None
See application file for complete search history.

(56) References Cited

U.S. PATENT DOCUMENTS

| 2011/0312387 A1 | 12/2011 | Heo et al. |
| 2015/0089349 A1 | 3/2015 | Duplessis et al. |

*Primary Examiner* — Syed A Roni
(74) *Attorney, Agent, or Firm* — Patterson & Sheridan, LLP

(57) ABSTRACT

This disclosure relates to cross-platform applications that include native and non-native components on mobile devices. An exemplary method generally includes receiving a first workflow step definition including a first set of widgets to be loaded into an application shell. A mobile shell identifies a type of each widget in the first set of widgets (e.g., native or platform-agnostic) and loads each widget into the mobile shell based on the widget type. For a platform-agnostic widget, the mobile shell creates a platform-agnostic widget proxy service, which provides a runtime environment. The platform-agnostic widget may be loaded into the platform-agnostic widget proxy service and executes in the runtime provided thereby.

20 Claims, 8 Drawing Sheets

DEPLOYING CROSS-PLATFORM APPLICATIONS ON MOBILE DEVICES WITH NATIVE AND WEB COMPONENTS

CROSS REFERENCE TO RELATED APPLICATIONS

This Application is a continuation of and hereby claims priority under 35 U.S.C. § 120 to U.S. patent application Ser. No. 15/851,788, filed on Dec. 22, 2017, and now issued as U.S. Pat. No. 10,564,988, the contents of which are incorporated herein in their entirety.

BACKGROUND

Field

Aspects of the present disclosure generally relate to techniques for deploying software applications, and more specifically to deploying software applications with native and platform-agnostic based components on mobile devices.

Description of the Related Art

Software applications can be consumed on a variety of devices, including desktop computers, laptop computers, tablet computers, smartphones, and the like. These applications may be native applications (e.g., applications for which an executable file is built specifically for that platform), web components hosted in a native application, or web applications in which data provided by a user is processed remotely. In many cases, building applications targeting different platforms entails the use of platform-specific code monoliths, which include code for generating application logic and a user interface tightly bound to the application logic. In some cases, applications targeting a common platform do not work on every device implementing the common platform, resulting in developers having to write application logic that accommodates different devices on the common platform.

As the number of applications targeting different platforms and applications supporting variations on a common workflow increases, the difficulty in providing a different version of the same application for each device increases. For example, a set of tax preparation applications perform the same general task of preparing a user's taxes, but a variety of discrete software artifacts may exist for variations on the workflow (e.g., one artifact may execute a workflow for preparing a simple tax return for a taxpayer in the United States, another artifact may execute a workflow for preparing a complex tax return for a taxpayer in the United States, another artifact may execute a workflow for preparing a simple tax return in Canada, and the like). While these applications may perform the same general task (e.g., of tax preparation) and may share a significant amount of code, each application may also implement custom code dedicated to performing a task according to each platform.

Because these applications may implement a combination of custom and shared application logic that is bound to the user interface of the application, building and maintaining these applications generally requires large amounts of developer time. For example, if a common code component is modified, developers may need to verify that the modification does not adversely affect the operation of applications that use the common code component (e.g., render custom code components in a specific application unusable or otherwise modify the functionality of the custom code components). Further, as new variants of a workflow are identified, additional applications may be built, which adds to the universe of applications to be maintained.

Therefore, there is a need for systems that reduce the amount of time needed to develop, update, and deploy applications across different computing platforms.

SUMMARY

One embodiment of the present disclosure includes a system comprising a processor and a memory. The memory comprises executable instructions, which, when executed by the processor, cause the system to receive, from a server, a first workflow step definition including a first set of widgets to be loaded into an application shell. The memory further comprises instructions which, when executed by the processor, cause the system to identify that a first widget of the first set of widgets in the first workflow step definition is implemented using native code components. The memory further comprises instructions which, when executed by the processor, cause the system to load the first widget of the first set of widgets directly into the application. The memory further comprises instructions which, when executed by the processor, cause the system to identify that a second widget of the first set of widgets in the first workflow step definition is implemented using platform-agnostic code components. The memory further comprises instructions which, when executed by the processor, cause the system to load the second widget of the first set of widgets into the application shell via a platform-agnostic widget proxy service.

Another embodiment provides a computer-readable storage medium having instructions, which, when executed on a processor, perform an operation for loading a cross-platform application having native code components and platform-agnostic code components in an application shell. The operation generally includes receiving, from a server, a first workflow step definition including a first set of widgets to be loaded into the application shell. The operation also includes identifying that a first widget of the first set of widgets in the first workflow step definition is implemented using native code components. The operation also includes loading the first widget of the set of widgets directly into the application shell. The operation also includes identifying that a second widget of the first set of widgets in the first workflow step definition is implemented using platform-agnostic code components. The operation also includes loading the second widget of the first set of widgets into the application shell via a platform-agnostic widget proxy service.

Still another embodiment of the present disclosure includes a method for loading a cross-platform application having native code components and platform-agnostic code components in an application shell. The method generally includes receiving, from a server, a first workflow step definition including a first set of widgets to be loaded into the application shell. The method also includes identifying that a first widget of the first set of widgets in the first workflow step definition is implemented using native code components. The method also includes loading the first widget of the set of widgets directly into the application shell. The method also includes identifying that a second widget of the first set of widgets in the first workflow step definition is implemented using platform-agnostic code components. The method also includes loading the second widget of the first set of widgets into the application shell via a platform-agnostic widget proxy service.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. Note, however, that the appended drawings illustrate only exemplary embodiments and are therefore not to be considered limiting of the scope of the disclosure, for the disclosure may admit to other equally effective embodiments.

DETAILED DESCRIPTION

Figure 1:
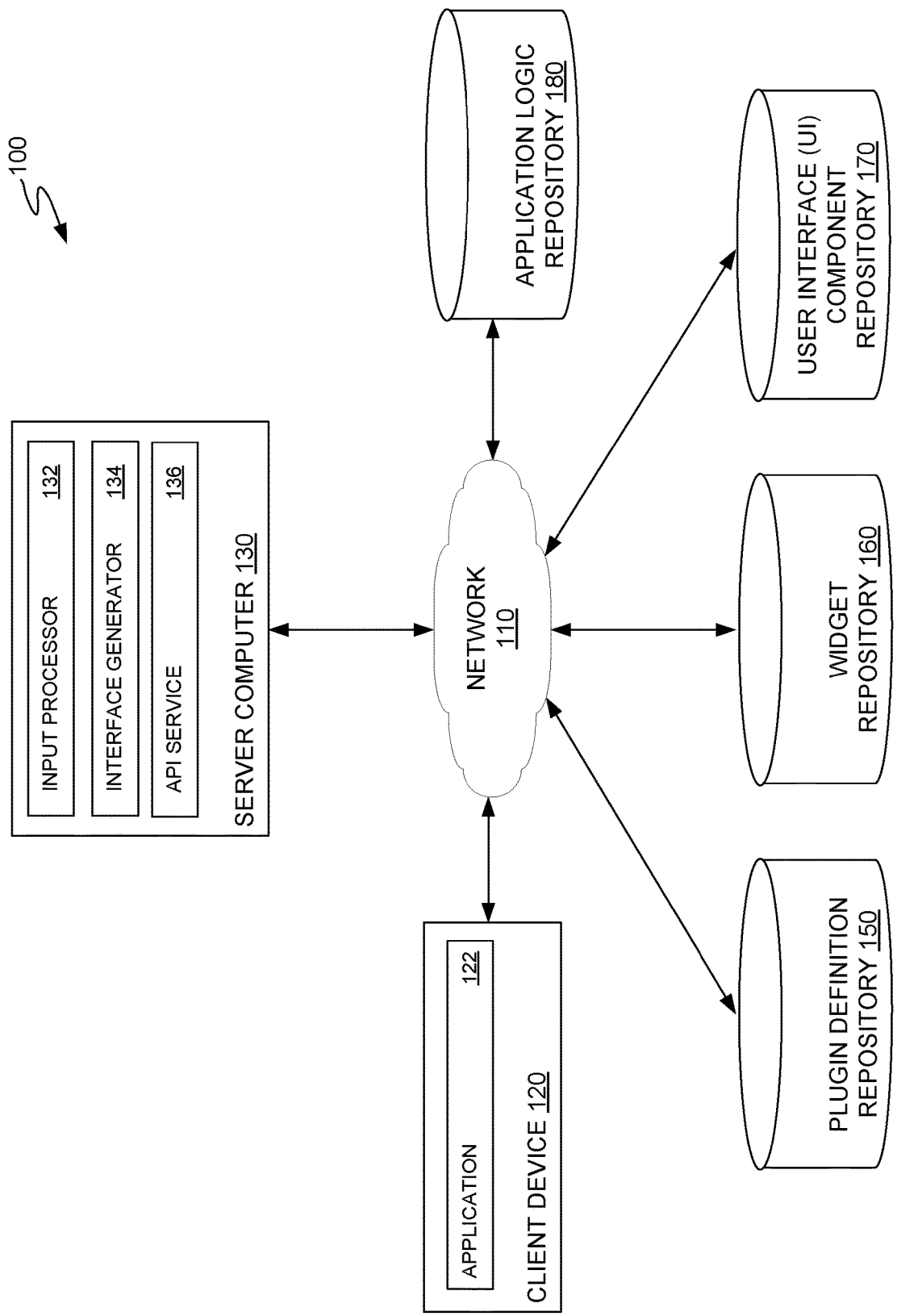
FIG. 1 illustrates an exemplary computing system in which user interfaces are dynamically generated and deployed to client devices executing a cross-platform application, according to one embodiment.

To reduce the amount of code to be maintained in a universe of related applications, software applications may be developed using a "write once, run anywhere" development paradigm. Typically, write once, run anywhere paradigms include an interpreter used to execute program code compiled into a common language, and allow for the generation and deployment of a single software artifact across different platforms. As used herein, a platform may include a device type (e.g., desktop computer, laptop computer, tablet computer, smartphone, and the like), an operating system (OS) type (e.g., an OS executing on a device), or both, etc. For example, a platform may include a particular device type regardless of OS executing on the device, a particular OS regardless of device type, or may be dependent on both the device type and OS. For example, one OS may span multiple device types (e.g. different model smartphones) and one device type may span multiple OSes (e.g., a single deployed model of a smartphone running different versions of an OS). In some instances, the platform may be further defined by attributes of the device type, such as screen formats (e.g., screen size, screen resolution, etc.) and input capabilities (e.g., multi-touch sensitive displays, pressure sensitive displays, and others). Thus, a platform may be defined as a set of device types, operating systems, and/or capabilities on which a particular software application may run.

Different software artifacts may need to be generated for different variations of a workflow and/or different types of platforms due to usability differences between the different types of devices (e.g., different user interfaces for desktop, web, and mobile applications, different capabilities of different types of devices, and the like). Different software artifacts may also need to be generated due to physical differences between types of devices (e.g., screen size, screen resolution, etc.) and differences in touch capabilities (e.g., determining a firmness of a touch) and gesture capabilities (i.e., what types of gestures are recognized by the device).

Because different software artifacts are generated for different variations of a workflow, developers may still need to debug a multitude of different software artifacts when changes are propagated to shared portions of application code. Further, write once, run anywhere paradigms generally have user interfaces tightly bound to application logic, which may cause developers to spend significant time to ensure that changes to application logic do not alter the user interface in an unexpected manner and to ensure that changes to the user interface do not alter or break the expected functionality of the underlying application logic.

Aspects of the present disclosure generally provide a mobile shell that allows modular UI components (e.g., native and non-native widgets) to execute within a native environment. Specifically, the mobile shell provides a runtime container in which modular widgets can execute. The mobile shell also provides the widgets with common services, such as activity logging, analytics, context tracking, and the like. The mobile shell may expose one or more Application Programming Interfaces (APIs), including a widget API to be used by applications for loading widgets into or unloading widgets from the mobile shell and a sandbox API for widgets to access common services. The widget API may be defined by the mobile shell and may be a common API for all widgets, whether native or non-native. Thus, the widget API provides a centralized API that can be used by different applications executing on different platforms.

For native and non-native widgets to execute within a native environment, the mobile shell may provide a runtime environment in which non-native widgets execute. The mobile shell may also centralize common services for all widgets (e.g., native and non-native). Executing native and non-native widgets within a native environment may provide a unified user experience for an application regardless of the platform on which the application executes. The combination of native and non-native widgets may allow the application to be executed on different platforms (e.g., a cross-platform application).

As disclosed herein, the mobile shell may improve the operation of a client device on which the mobile shell is implemented in several aspects. First, the use of modular UI components improves the performance of the client device by dividing an application workflow into manageable workflow steps. Thus, a system, in which a mobile shell is executing, may perform the loading of widgets, unloading of widgets, and rendering of a user interface more quickly and with fewer computing resources expended as a consequence of the speed improvement. Further, an amount of processing resources and memory necessary to render a user interface may be decreased by virtue of the modular UI components and by deallocating memory reserved for particular UI components when no longer needed. For these reasons and others, a device on which a mobile shell is executing may perform faster and with fewer processing and memory resources necessary. Similarly, the modular UI components themselves will perform better than known application programming techniques for the reasons described above.

FIG. 1 illustrates an exemplary computing system. As illustrated, computing system 100 includes a client device 120, a server computer 130, a plugin definition repository 150, a widget repository 160, a user interface (UI) component repository 170, and an application logic repository 180, connected via network 110.

Client device 120 may be any sort of computing device, such as a desktop computer, a laptop computer, a tablet computer, a smartphone, or the like. Client device 120 may execute an application 122 that communicates with the server computer 130 to obtain a user interface for the application 122 and provide data to the server computer 130 for processing. In one example, the application 122 executes a multi-step workflow where each step of the workflow is displayed as a set of interface components that are built dynamically based, at least in part, on the platform (e.g., type of device and operating system) and the current state of the application (e.g., a progress state of a workflow).

Client device 120 may also host a shell framework (i.e., an application shell) (not shown in FIG. 1) which executes within the application 122. Client device 120 may coordinate the interaction between the application and the server computer 130, the plugin definition repository 150, the widget repository 160, the user interface component repository 170, and the application logic repository 180.

In some cases, a user interface definition may include native user interface components, which may be specific to a platform, as well as platform-agnostic user interface components (e.g., web-based components) which may be shared across different platforms and allow for a common user interface to be generated across multiple platforms. In one embodiment, the collection of user interface components may be selected based on a particular platform or an application state, such as a progress state of a workflow. For example, a user interface definition for a step of a tax preparation workflow could include a combination of web-based user interface components used to manually add form data along with native user interface components that allow the application 122 to capture and process data from a camera at the client device 120. The web-based and native user interface components may be stored in the user interface component repository 170. In another portion of the tax preparation workflow, where a user is asked to identify tax deductions the user is entitled to claim, the user interface definition may identify a number of web-based user interface components from the user interface component repository 170 to render in the application 122.

In some embodiments, native code components may also be included in a user interface definition to take advantage of functionality exposed by the operating system executing on the client device 120. For example, native code components may be referenced in a user interface definition to generate notifications related to the application 122. In other examples, native code components can be referenced in a user interface definition to allow users to provide voice data into the application 122, engage in video chats with other users or with live support representatives using the application 122, etc. Further, native code components may be referenced in a user interface definition to enable a user to take advantage of input methods and technologies particular to a platform, such as a multi-touch and/or pressure-sensitive touchscreen display, etc.

As a user interacts with the application 122, the application 122 may transmit user-provided data and context information to the server computer 130 for processing. The context information may include device information (e.g., the type of device, the operating system in which the application 122 is being executed, capabilities of the device, and the like) and application state information. The application state information may include the current version of a user interface definition (e.g., widget definitions and/or updated rules for processing user-provided data) for a specific step of a workflow cached at the client device 120, the current step of the workflow executing in the application 122 (i.e., a progress state of the workflow), and a variation of the application a user is executing (e.g., the version of the application specific to a geographical region in which the client device 120 hosting the application 122 is located). When a user inputs data that is transmitted to the server computer 130, the application 122 may invoke a specific function in the user interface definition according to the data elements specified as inputs to the specific function. In response to transmitting data to the server computer 130, the application 122 may receive a new user interface definition identifying the present step of the workflow, the user interface components to be displayed on the client device 120, and the function(s) to be invoked upon completion of data entry for the present step of the workflow.

The server computer 130 may receive user-input data from the client device 120 and generate a user interface definition for the client device to display user interface components for the next step of a workflow based on the received user input. As illustrated in FIG. 1, the server computer 130 includes an input processor 132, an interface generator 134, and an API service 136. While the server computer 130 is depicted as a single server in FIG. 1, in other embodiments the functions of the server computer 130 (e.g., functions of the input processor 132, the interface generator 134, and the API service 136) may be implemented on more than one server, such as an application server and a gateway server (not shown in FIG. 1).

The input processor 132 may receive user-provided data from the application 122 (e.g., form input), an indication of the next step to be performed in a workflow executing in the application 122, and other context information from the client device 120 for processing. The input processor 132 generally invokes one or more functions exposed by the API service 136 and identified in the user-provided data. The input processor 132 examines any other data provided by the client device 120 to generate a user interface definition for the client device 120 including one or more plugins from the plugin definition repository 150.

A plugin may include a collection of widgets that the client device 120 and/or the server computer 130 can use to represent a discrete task. A plugin may reference one or more functions defined in the API service 136 that are invoked to complete the discrete task. Each widget may define a collection of user interface components to render on the client device 120 to complete a workflow step or to enable a user to input data into the application 122. Each widget may also provide a particular functionality to the application 122 and be supported by services needed to perform the functionality. The functionality provided by a widget is integrated into the user interface of the application. Thus, a user of the client device 120 and application 122 may perceive the functionality of the widget to be native to the application 122. The services supporting the widget may be provided by a shell and may include activity logging, analytics, authorization context tracking, application context tracking, and so on. The plugin may identify included widgets, functions the plugin can invoke in the API service 136, permissions associated with the plugin, behaviors of the plugin, intended interactions with other parts of a service, such as API service 136, and the like. Each plugin may be versioned as the widget definitions and/or application logic associated with a plugin is updated.

In some cases, the input processor 132 may receive information about the current version of a user interface definition associated with a plugin cached at the client device 120. If the input processor 132 determines the current version of the plugin in the plugin definition repository 150 matches the version of the plugin cached at the client device 120, the input processor 132 can indicate to the client device 120 to render the user interface associated with the next step in the workflow using the cached version. Because the cached version of the user interface definition at client device 120 is the most current version of the user interface definition, input processor 132 need not invoke the interface generator 134 to generate an updated user interface definition for the step of the workflow to be displayed on the client device 120.

If, however, the input processor 132 determines that the current version of the user interface definition cached at the client device 120 is outdated or that no user interface definition for the requested step of the workflow exists at the client device 120, input processor can invoke the interface generator 134 to generate the user interface definition for the requested step of the workflow. In some cases, the input processor 132 may invoke the interface generator 134 with information identifying the requested step of the workflow and device-specific information (e.g., device type, operating system, whether the application is a native application or is executing in a web-based shell, and other device-specific information).

The interface generator 134 may generate a user interface definition using the information received from the client device 120 and transmit the generated user interface definition to the client device 120 for rendering and execution by the application 122. To generate the user interface definition, the interface generator 134 uses the information identifying the requested step of the workflow and the context information to identify one or more plugins to select for populating the user interface definition. The interface generator 134 may populate the user interface definition according to a defined order in which the widgets associated with the one or more plugins are to be displayed to a user and transmit the user interface definition to the client device 120. The interface generator 134 may generate a user interface definition referencing web-based user interface components (i.e., not native), user interface components shared across different platforms, user interface components belonging to a specific platform (i.e., native interface components), or a combination thereof. The user interface definition may additionally reference one or more functions that can be invoked by the generated user interface. These functions may commit data to one or more data stores associated with the application 122, transmit data to the server computer 130 for processing, or route user-provided data to one or more expert systems on the server computer 130 for analysis (e.g., to guide a user through a workflow).

Because the user interface definition references one or more functions that can be executed through the generated user interface, but generally does not include the code for executing the one or more functions, the server computer 130 allows for the decoupling of a user interface and the application logic for performing a task. Thus, a user generally receives a user interface definition that is platform specific, i.e., customized for the client device 120 on which the user is executing the application 122. The user interface definition interacts with underlying application logic (e.g., stored in application logic repository 180) that may be implemented as a single code base maintained independently from platform-specific code. Common application components need not be duplicated, updated, and tested for platform-specific versions of the same application. Changes in application logic (e.g., to support new variations of a workflow, to modify how data is processed at a specific step in a workflow, and the like) generally do not affect the functionality of a generated user interface, and updated application logic may be executed by client devices without building discrete software artifacts with the updated application logic.

For example, suppose that the application 122 is a tax preparation application executing on a client device 120 and that the user of the client device 120 is attempting to provide wage income data to the application 122. The interface generator 134 may identify multiple plugins that can be executed on the client device 120 to allow a user to import wage income data into the application 122. For example, one plugin may allow a user to capture one or more images of a document (e.g., as still images or a live stream from a camera integrated into or otherwise connected to the client device 120) and provide the data extracted from the document to the API service 136. Because this plugin interfaces directly with device-specific capabilities, this plugin may include references to device-specific (i.e., native) logic and user interface components tied to image capture and data extraction. Meanwhile, another plugin may generate a form used to input data. The interface generator 134 may generate a user interface definition including references to both the image capture plugin (with the native code components needed to interact with the device-specific functionality) and the form entry plugin (with a form layout definition for the one or more data entry boxes to be displayed to the user) and transmit the user interface definition to the client device 120 for execution.

In another example, suppose that the application 122 is an accounting application executing on the client device 120 and that a user of the client device 120 is entering information from paper invoices into an accounts payable or accounts receivable account in the accounting application. The application 122 can reuse the image capture plugin discussed above. In conjunction with other plugins for extracting workflow-specific data from a captured image of a document, the application 122 can extract relevant data from the captured image and provide the relevant data to the server computer 130 hosting the API service 136 for performing accounting tasks.

Another benefit of decoupling the user interface and the application logic is the ability to allow a user to move between devices running an application (e.g., 122) while executing a workflow. For example, a user may begin a workflow (e.g., a tax preparation) on one device that receives a device-specific user interface (e.g., a smartphone) and later finish the workflow on another device, such as a desktop computer. Because the application logic is not tied to the particular platform, the application logic may be deployed dynamically to different types of devices through platform-specific user interfaces and enable a user to leverage the application logic in a more flexible fashion.

The server computer 130 may host application logic for a specific application and an application programming interface (API) service 136 that allows the application 122 to invoke the functionality of the application hosted on the server computer 130. When the API service 136 receives a query from a client device 120, the API service 136 can verify that the received query is valid. If the API service 136 determines that the received query is valid, the API service 136 invokes the function specified in the query.

The plugin definition repository 150 generally stores plugin definitions for specific tasks implemented in a workflow. A plugin definition may reference one or more widgets defined in the widget repository 160 and one or more functions exposed by the API service 136 and stored in the application logic repository 180. The widgets may define a layout of a user interface to be rendered on client device 120 and include a plurality of user interface components. As discussed above, the widgets may include platform-agnostic user interface components, native user interface components, or a combination of platform-agnostic and native user interface components. Widgets that do not depend on platform-specific functionality may be defined using platform-agnostic user interface components, while widgets that implement device-specific functionality, such as image capture, audio capture, notification generation, and other device-specific functions, may use native (platform-specific) user interface components linked to native application logic. In some examples, plugin definition repository 150 may be a versioned repository, and plugin version data may be updated as the configuration of a plugin (e.g., widgets used by the plugin, functions referenced by the plugin, and the like) changes.

Widget repository 160 may store data defining widgets that can be included in one or more plugins defined in plugin definition repository 150. Each widget stored in widget repository 160 may be defined as a set of user interface components configured to perform a specific task. For example, widgets may include components for performing image processing or audio processing on a client device 120, components for obtaining data entry from a user through a data entry form, and the like. Widgets that do not depend on platform-specific functionality are non-native widgets. These widgets may be platform-agnostic and may include web-based widgets or framework-based widgets. A native widget may be built and implemented using code components that are native to the platform. For example, a native code component (e.g., a user interface component that is native to the platform) may be built using code components that are native to the operating system executing on the client device 120. Thus, the native code components can be executed directly by an application within the operating system, or executed as a stand-alone user interface component within the operating system.

A platform-agnostic widget may be built and implemented using platform-agnostic code components (e.g., non-native code components). A platform-agnostic code component may include, for example, a web-based code component that can be executed by a web browser (e.g., web widgets) or a framework-based code components that can be executed in a framework-based runtime environment (e.g., framework-based widgets). A platform-agnostic code component may be used to generate a user interface that can be shared across different platforms. Thus, platform-agnostic code components may allow a common user interface to be generated across multiple platforms.

User interface component repository 170 generally stores data defining platform-agnostic user interface components that may be used by one or more widgets to display a user interface on client device 120. In some cases, user interface component repository 170 may store user interface components that can be used across different computing platforms (i.e., platform-agnostic components) and user interface components that may be specific to a particular platform (e.g., user interface components corresponding to functionalities of a particular type of device running a particular operating system). As discussed, a user interface definition generated by interface generator 134 may include data identifying the plurality of user interface components to be displayed on client device 120, and client device 120 can retrieve the identified user interface components from user interface component repository 170 or from user interface components deployed on the client device 120 based on whether the user interface components are platform-agnostic or platform-specific functionality.

Application logic repository 180 may provide a versioned repository containing code contracts and other software artifacts for the functional code implementing the workflow processed by the server computer 130 and displayed on the client device 120. The code contracts stored in application logic repository 180 may be associated with one or more functions that a user can invoke through interaction with the one or more user interface components specified in a user interface definition and associated with a plugin associated with a step in the workflow. Each code contract may define, for example, the name of a function that a user can invoke, the required inputs for the function, optional inputs that may be, but are not required to be, provided in an invocation of the function, and the output generated by the function. The other software artifacts may further describe the one or more functions that a user can invoke, such as the functional code implementing the workflow. Server computer 130 may store application logic in the application logic repository 180 and retrieve application logic from the application logic repository 180.

Figure 2:
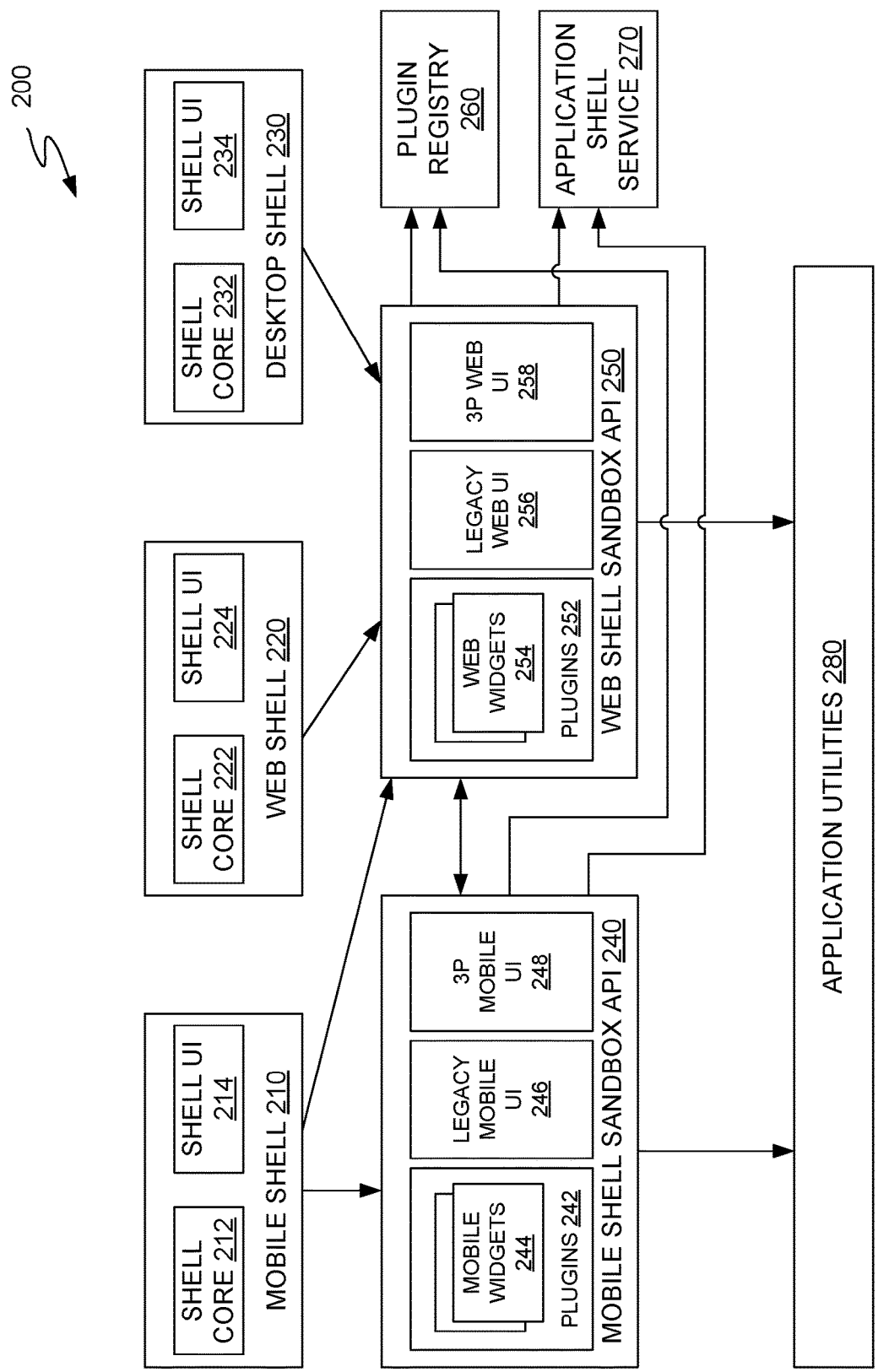
FIG. 2 illustrates an exemplary architecture in which user interfaces are dynamically generated and deployed to client devices executing a cross-platform application, according to one embodiment.

FIG. 2 illustrates an exemplary system architecture 200 for dynamically generating and deploying user interfaces in cross-platform applications, according to an embodiment. While the description of FIG. 2 focuses on web widgets as a non-native type of widget, the same concepts apply to other non-native widgets such as framework-based widgets.

As illustrated, system architecture 200 generally includes a native mobile shell 210, a web shell 220, and a native desktop shell 230, each of which may communicate with one or more shell sandbox APIs, such as the mobile shell sandbox API 240 and the web shell sandbox API 250, to access application utilities and other capabilities provided by a shell runtime, as discussed in further detail herein.

Each shell 210, 220, and 230 may allow for the dynamic generation of customized user interfaces and user experiences for applications executing on top of the shell. Each shell may be made available (e.g., via one or more data repositories) as a library that may be semantically versioned (e.g., versioned using a three part version number, such as 1.2.3, representing a major version, a minor version and a patch, respectively). Native mobile applications may consume the mobile shell 210 as a library and package the mobile shell 210 as part of the application. The web shell 220, however, may be hosted by an application server, such as server computer 130 in FIG. 1, for a specific software product and may be deployed such that applications and widgets built on the web shell 220 are continually integrated and updated. In some aspects, the native desktop shell 230 may use similar components as the web shell 220, because the native desktop shell 230 may be configured to encapsulate a web interface to deliver a software product to a user.

The shells 210, 220, and 230 may use consistent application programming interfaces (APIs) across platforms. While the implementation of API functions may differ between the mobile shell 210, the web shell 220, and the desktop shell 230, the APIs may be defined according to consistent code contracts that define required inputs, optional inputs, and required outputs for each function exposed by the API. The inputs and outputs may be defined, for example, as a variable name and a variable type indicating a data type associated with each named variable to be provided as input into a function or generated as an output by the function. To promote code reuse across the shells 210, 220, and 230, platform-agnostic code (e.g., code written in JavaScript, PHP, or other languages that can be executed in various computing environments with similar execution results) may be used to implement the shells 210, 220, and 230. In some aspects, each of the shells 210, 220, and 230 may include functionality tailored to the unique capabilities of each platform (e.g., a particular device type, a particular operating system, or both). For example, because mobile devices may have less computing power than desktop computers, laptop computers, or cloud computer farms on which an application may be executed, the mobile shell 210 may additionally include support for hydrating a platform-agnostic widget so that the hydrated data may be stored in memory, but not loaded into an object until the object is to be used.

Each shell 210, 220, and 230 may allow for the creation of dynamic user interfaces and user experiences customized for a particular user by combining native and non-native UI components from a variety of relevant plugins, as discussed above. The plugins selected by a shell 210, 220, or 230 may be selected based on the context in which a user is executing the application 122 (e.g., a step in a workflow that the user is currently executing, the next step in the workflow that the user may be expected to execute, and so on) and, in some embodiments, the platform on which the user is executing the application 122.

In some aspects, plugins 242 and 252 may be modular, self-contained software components of an application that expose specific features of the application. Examples of plugins may include navigation bars that allow a user to move between different steps of a workflow executed within the application 122, progress bars that display an amount of the workflow that a user has completed (and correspondingly an amount of the workflow that remains to be completed), application-specific features, features that leverage hardware present on the computing device on which the application 122 is executing (e.g., image capture using one or more cameras integrated into a client device 120, authentication using one or more biometric data capture devices integrated into a client device 120, etc.), and so on. Because each plugin may be self-contained, applications may be decomposed into a plurality of independently maintainable components (i.e., independently debugged, updated, extended, etc.).

Each plugin (e.g., 242 or 252) may include two parts: a configuration and one or more of user interface widgets. The configuration generally identifies the user interface widgets included in the plugin, a code contract, permissions, the behavior of the plugin, and intended interactions with other widgets or an application (e.g., application 122 in FIG. 1). In some embodiments, legacy code components (e.g., native code components that were created for previous versions of a software product and are intended to be reused in a cross-platform application) and third party components (e.g., extensions to an application) may be included in a plugin to be compatible with the platform. The user interfaces associated with legacy components or third party components may be implemented as a widget that can be loaded into a shell 210, 220, and/or 230 via a widget shim layer.

Each plugin (e.g., 242 and 252) and widget (e.g., 244 and 254) may be registered in a central configuration service, such as plugin registry 260. By registering plugins and widgets in plugin registry 260, and by defining plugins as a configuration and a plurality of user interface widgets, different versions of a cross-platform application may be supported by various platforms (e.g., various combinations of types of devices and operating systems). For example, an application deployed via web shell 220 and/or native desktop shell 230 may integrate cross-platform user interface generation tools, JavaScript libraries, such as Dojo, JQuery, or Angular, and other technologies which can be leveraged to deploy a web-based version of a cross-platform user interface, regardless of whether the user interface is being deployed in a web browser or a native application that includes a web browser component. Similarly, an application deployed via mobile shell 210 may integrate cross-platform user interface generation tools, native code components (e.g., Java components for applications deployed on Android devices or Objective C components for applications deployed on mobile device operating systems, such as iOS, Android, Windows Mobile, at the like), and other technologies that can be leveraged to deploy a native mobile version of the cross-platform user interface.

Mobile shell 210 generally is an application that executes on a mobile device (e.g., a smartphone, handheld computer, or tablet computer) and integrates web-based user interfaces (UIs) and native mobile UIs to create a customized application that is tailored to the capabilities of the mobile device on which mobile shell 210 executes. To integrate web-based UIs and native mobile UIs, an instance of web shell 220 may be integrated into mobile shell 210 at runtime (not shown). UI components that are executed as a web component (e.g., web forms, hypertext markup language (HTML) UI elements, and the like) may be executed within the web shell 220. The mobile shell 210 can additionally leverage device-specific capabilities using native mobile UIs and code components. These device-specific capabilities may include, for example, integrated cameras for image capture and data extraction (e.g., of a tax form, a receipt, or other printed document with data to be ingested into an application), movement or location tracking devices (e.g., accelerometers, satellite positioning system (Global Positioning System (GPS), GLONASS, GALILEO, etc.) receivers or cellular-assisted satellite positioning systems), and other device-specific capabilities that widgets can leverage to perform actions related to an application hosted in the mobile shell 210.

The web shell 220 integrated into the mobile shell 210 can delegate one or more actions to the mobile shell 210 via a programmatic bridge, which allows for applications executed within the mobile shell 210 to be customized and optimized for different kinds of mobile devices. In one example, customization and optimization of an application executing in the mobile shell 210 may include the use of different image capture modules based on the capabilities of a mobile device on which the mobile shell 210 is executing. For lower-cost devices with slower processors, the image capture module executed in the mobile shell 210 may, at least in part, offload image processing to a cloud service or another computing device, while for higher-cost devices with more processing power, the image capture module executed in the mobile shell 210 may perform image processing and data extraction on the mobile device itself. In another example, the customization and optimization of an application executing in the mobile shell 210 may include customizations based on the screen size and screen resolution of the device on which the mobile shell 210 is executing. For a mobile shell 210 executing on a smartphone, navigation components may be hidden until requested by a user, while navigation components may be displayed in a mobile shell 210 executing on a mobile device having a larger screen (e.g., a tablet computer). In another example, a mobile shell 210 executing on a smartphone with a high-resolution screen (e.g., a QHD (2560 pixels by 1440 pixels), 4K (3840 pixels by 2160 pixels), or 8K (7680 pixels by 4320 pixels) screen) may receive user interface components that are scaled for high-resolution screens, while a mobile shell 210 executing on a mobile phone with a lower-resolution screen (e.g., a 720p (1280 pixels by 720 pixels) or 1080p (1920 pixels by 1080 pixels) screen) may receive user interface components that are scaled for lower-resolution screens.

Shells 210, 220, and 230 may host a variety of applications that share user interface components (e.g., widgets and plugins) to implement different functionality. To reduce the storage and memory footprint of an application hosted within a shell, shells 210, 220, and 230 may load widgets based on the application hosted within the shell. For example, a tax preparation application may load a first set of widgets (e.g., tax liability/refund calculators, a completeness engine, tax support modules, emotional response modules, and the like). An accounting application, on the other hand, may load a different set of widgets (e.g., credit/debit calculators, statement generators, and the like), as the functionality of the accounting application does not depend on the same widgets as the tax preparation application.

Generally, shells 210, 220, and 230 provide a widget specification. The widget specification generally is a platform-neutral description of UI widgets that is implemented by the widgets. The widgets that are loaded into shells 210, 220, and 230 are generally not dependent on the specific implementation of a shell 210, 220, or 230. Rather, the widgets may depend on a sandbox application programming interface provided by a shell. For example, the web shell sandbox API 250 may be a common sandbox for all platform-agnostic widgets (i.e., cross-platform widgets). As illustrated in FIG. 2, mobile shell 210 exposes a mobile shell sandbox API 240 and a web shell sandbox API 250, while web shell 220 and native desktop shell 230 expose the web shell sandbox API 250. Sandbox APIs 240 and 250 may provide widgets with access to shell services, such as common capabilities, application context, authentication, and the like. Because the widgets depend on a sandbox API 240 and/or 250, widgets can be built with minimal dependencies on other widgets (e.g., not loaded in the shell) or services other than those provided by the shell, which allows the widgets to be embeddable into any application that is hosted within a shell 210, 220, or 230.

In some embodiments, application-specific monoliths (e.g., code for generating a user interface and application logic) that are not cross-platform compatible may be decomposed into a plurality of widgets that may be hosted within a shell 210, 220, or 230. To allow application-specific monoliths (or components of an application-specific monolith) to be executed within a shell 210, 220, or 230, the shells 210, 220, and 230 can execute an application-specific monolith or components of an application-specific monolith in a sandbox widget. The sandbox widget allows for the execution of legacy code within a shell 210, 220, or 230 that conforms to the functionality, calling conventions, and code execution rules enforced by sandbox APIs 240 and/or 250. The sandbox widget generally delegates tasks to legacy code that implements the application-specific monolith, but exposes the functionality of the widget in a manner that conforms to the code contracts established for communications between plugins and widgets in the shells. As application-specific monoliths are transitioned to widgets and plugins, usage of the sandbox implementation of application-specific monoliths may be discontinued.

Shells 210, 220, and 230 additionally provide mechanisms to enable widgets hosted within a shell 210, 220, or 230 to communicate with other widgets hosted in the shell. The communications mechanisms provided by a shell may provide for asynchronous communications between different widgets. These communications may be, in some cases, event driven (e.g., triggered when some condition occurs within an application hosted by a shell, such as user interaction with a graphical user interface component, expiration of a timer, etc.). In some cases, asynchronous communications between different widgets may be supported via communications channels between the widgets.

Shells 210, 220, and 230 may provide support for login, user authentication, and hydration of user interface widgets. For login and user authentication, shells 210, 220, and 230 may include modules for username/password authentication, biometric authentication, possession-based authentication, or a combination of authentication methods (multi-factor authentication). Biometric authentication modules may interact with a variety of authentication data capture devices on a client device, such as front-facing cameras on tablets or smartphones, web cameras on laptop or desktop computing devices, fingerprint readers, iris scanners, or other biometric devices for user authentication to allow for user enrollment and authentication.

Shells 210, 220, and 230 may be configured to support extensions. Support for extensions allows existing applications to add to the capabilities of the shells and customize shells for application-specific needs. For example, multiple hydration extensions may be made available for use in applications hosted within a shell 210, 220, or 230. These extensions may provide different mechanisms for mapping data into data objects for use in an application (or a portion of an application). By supporting extensions, shells 210, 220, and 230 further assist the transition from application code monoliths to applications that are dynamically created from a plurality of independently maintainable widgets and plugins, thereby simplifying software development and allowing for the rapid release of applications with consistent user experiences.

As illustrated, each shell 210, 220, and 230 includes a shell core 212, 222, and 232, respectively, and a shell user interface 214, 224, and 234, respectively. The shell cores 212, 222, and 232 may include a shell kernel that manages the lifecycle of an application hosted within a shell 210, 220, or 230 and the shell user interface 214, 224, or 234 rendered according to a device-specific user interface definition. Lifecycle management generally includes initialization of an application, termination of an application, deferring of actions, pausing of an application (e.g., when an application is minimized or otherwise placed in a suspended state), state recovery (e.g., when an application is maximized or otherwise reactivated from a suspended state), and the like. The shell cores 212, 222, and 232, may further provide support for hydration, plugin/widget management, event handling, asynchronous communications, and shell extension and customization.

Shell user interfaces 214, 224, and 234 render user interfaces dynamically based on client device information and the workflow that a user is executing. Shell user interfaces 214, 224, and 234 provide layout and navigation management, flow control (e.g., to control the transition from one step to another step of a workflow implemented by an application hosted in shells 210, 220, or 230), user login/authentication, intra-application communications, and the like. Shell user interfaces 214, 224, and 234 may be a barebones (or blank) user interface. Applications hosted within a shell 210, 220, or 230 can populate shell user interfaces 214, 224, 234 with the graphical user interface components to be rendered to enable a user to perform one or more tasks. Applications using a shell user interface 214, 224, or 234 generally define the user experience, which allows for application development teams of each shell UI to customize the user experience for the specific platform and application hosted within a corresponding shell 210, 220, or 230.

As illustrated, shell sandbox APIs 240 and 250 allow for execution of a variety of plugins and widgets. The specific plugins and widgets hosted in sandbox APIs 240 and 250 may be determined based on a type of device being used (e.g., native mobile widgets may be executed using mobile shell sandbox API 240, while web widgets may be executed using web shell sandbox API 250). As illustrated, mobile shell sandbox API 240 supports the execution of plugins 242, including one or more mobile widgets 244, a legacy mobile UI 246 (e.g., a UI associated with legacy code monoliths implemented as a widget that can be loaded into a shell 210, 220, and/or 230 of architecture 200), and third party mobile UIs 248 associated with extensions to one or more applications. Web shell sandbox API 250, which may be leveraged by any of mobile shell 210, web shell 220, and desktop shell 230 for the execution of web-based widgets, supports the execution of plugins 252, including one or more web widgets 254, a legacy web UI 256 associated with legacy code monoliths implemented as a widget that can be loaded into a shell 210, 220, and/or 230 of architecture 200, and third-party web UIs 258 associated with extensions to one or more web applications. Third party UIs 248 and 258 may be developed and deployed by other developers for integration into one or more software product offerings that may be executed within a shell 210, 220, or 230.

Shell sandbox APIs 240 and 250 may provide mobile widgets 244 and web widgets 254 access to application utilities 280 and common capabilities. The application utilities 280 and common capabilities may be provided by a shell runtime. These utilities and common capabilities may include, for example, activity logging, analytics, authorization context tracking, application context tracking, and so on. The shell sandbox APIs 240 and 250 may provide a versioned public code contract that defines how consumers (i.e., different widgets and plugins, regardless of whether a widget or plugin is a first-party widget or plugin or a third-party widget or plugin) interact with the sandbox and the functionality exposed by shell sandbox APIs 240, 250. At runtime, shells 210, 220, and 230 can create an instance of a sandbox and make the sandbox available to widgets at runtime, and the widgets loaded into a shell 210, 220, or 230 can access sandbox-provided services according to the versioned public code contract. In some aspects, the sandbox APIs 240, 250 may be extended by applications hosted in a shell 210, 220, or 230 to add application-specific features and behavior.

As discussed, application utilities 280 may be provided to widgets and plugins via one of shell sandbox APIs 240 or 250. In some cases, the utilities may include an application shell service 270, which manages initializing each shell by orchestrating between a plugin registry 260 and platform services for the relevant data to initialize the shell, which may be customized for a specific application and platform (e.g., for application X on mobile, on web, and on desktop/laptop computers). In some aspects, a mobile version of application shell service 270 may define a default configuration for initialization that may be packaged with a mobile application to optimize the performance of the mobile application.

Plugin registry 260 represents a centrally managed service that manages the plugin configurations that may be used by applications hosted in shells 210, 220, or 230 to provide customized user experiences. The plugin registry 260 generally is responsible for delivering applicable configuration data for a specific application.

Figure 3:
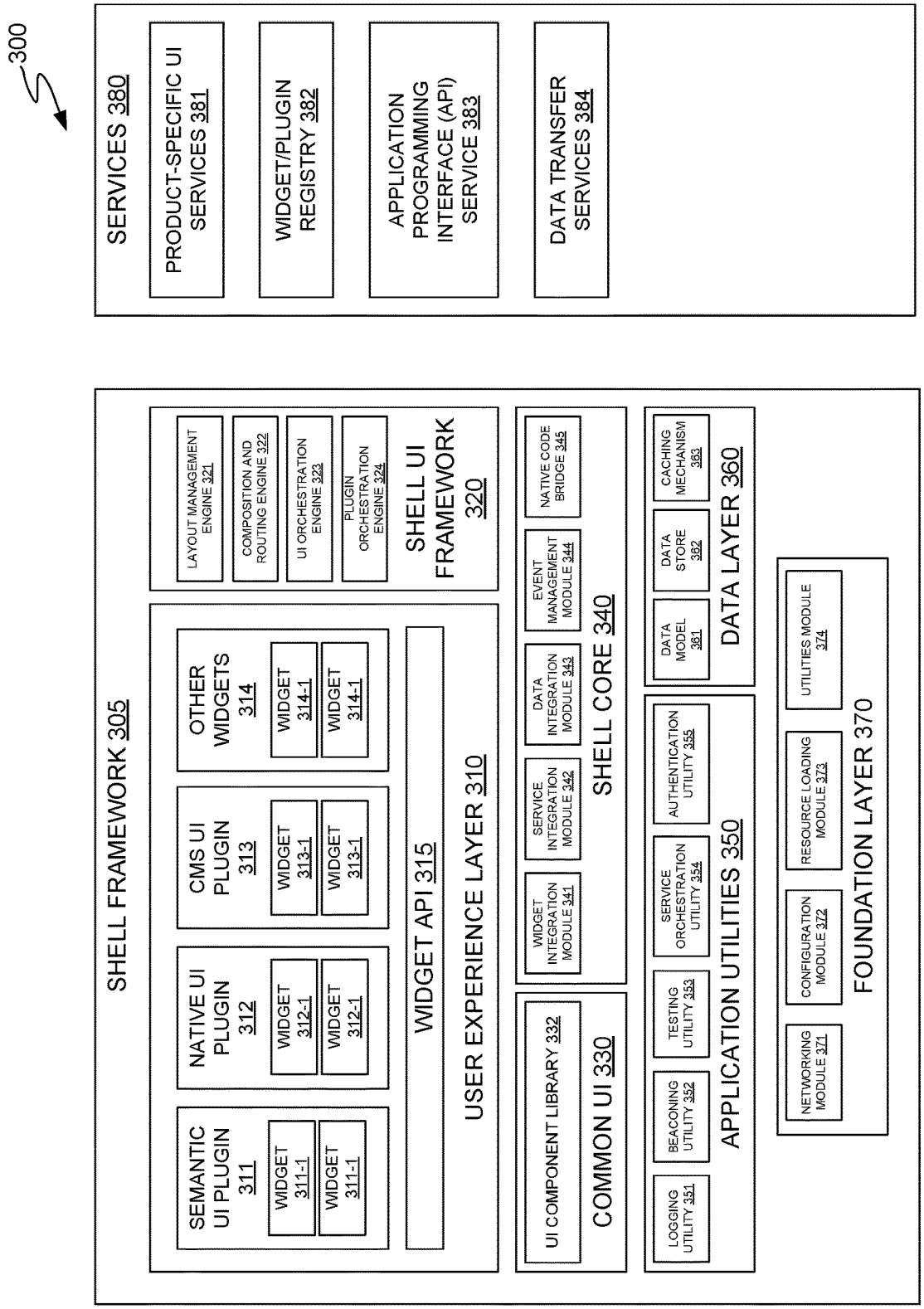
FIG. 3 illustrates an example shell framework architecture for dynamically generating and deploying user interfaces to client devices executing a cross-platform application, according to one embodiment.

FIG. 3 illustrates an example shell architecture 300 for dynamically generating and deploying user interfaces in cross-platform applications. As illustrated, shell architecture 300 generally includes an application shell framework 305 and services 380.

Application shell framework 305 generally comprises a majority of the application code and provides the underlying architecture that enables the dynamic generation of user interfaces for applications based on user context, device information, and so on. As illustrated, shell framework 305 includes a user experience layer 310, a shell user interface framework 320, a common user interface layer 330, shell core 340, application utilities 350, application data 360, and foundation layer 370.

User experience layer 310 generally hosts a plurality of plugins 311, 312, 313, 314 and a widget application programming interface (API) 315. Semantic UI plugin 311 generally hosts a plurality of cross-platform widgets 311-1. The cross-platform widgets 311-1 generally are widgets that may be rendered on a variety of computing devices (e.g., smartphones executing various operating systems, desktop computers, laptop computers, tablets, etc.) in either native application shells or a web shell executable within a web browser.

Native UI plugin 312 generally hosts a plurality of device-specific widgets 312-1 which may implement a variety of device-specific features.

Content Management System (CMS) UI plugin 313 generally hosts a plurality of widgets 313-1 that are used to implement a content management system within an application hosted within a shell. These CMS widgets 313-1, for example, provide document versioning, document tracking, and other services that can be used to manage documents uploaded and created by an application.

Other widgets 314 generally hosts, for example, widgets 314-1, which may include any additional widgets written using current technology or new technology that may be added over time.

Widget API 315 generally provides an interface to the various widgets hosted within the one or more plugins 311, 312, 313, 314 to allow the widgets to access one or more tools hosted in the shell core 340 and/or application utilities 350, access application data 360, or interact with device hardware through foundation layer 370.

Shell UI framework 320 generally implements one or more modules that aid in rendering a user interface on a device. As illustrated, shell UI framework 320 generally includes a layout management engine 321, composition and routing engine 322, UI orchestration engine 323, and plugin orchestration engine 324. Layout management engine 321 generally uses information in a device-specific user interface definition to determine an order in which plugins, widgets, and the associated user interface components are displayed on a device. Composition and routing engine 322 generally renders the user interface on a device and instantiates one or more event handlers to route user interaction to the appropriate function or code module for processing. UI orchestration engine 323 is generally a data-driven engine that uses data input into an application to orchestrate events that are invoked within an application. Plugin orchestration engine 324 generally orchestrates communications between different plugins, as discussed above.

Common UI 330 generally includes platform-agnostic user interface components that are shared across different versions of a shell (i.e., shared across native mobile shell 210, web shell 220, and native desktop shell 230). As illustrated, common UI 330 includes a UI component library 332, which may include information defining the various shared user interface components that can be rendered on a device. A plugin can reference specific components defined in UI component library 332 in a definition of the visual layout or organization of the plugin. When shell UI framework 320 renders the plugin, shell UI framework 320 accesses UI component library 332 to obtain definitions of the common UI components and renders the plugin according to the obtained definition.

Shell core 340 generally hosts one or more modules that enable execution of applications within an application shell. As illustrated, shell core 340 includes a widget integration module 341, service integration module 342, data integration module 343, event manager 344, and a native code bridge 345.

Application utilities 350 generally include the common utilities leveraged by various applications during execution. These utilities may include, among others, a logging utility 351, a beaconing utility 352, testing utility 353, service orchestration utility 354, and authorization utility 355. These utilities may be implemented according to a code contract that is consistent across different shells (i.e., across native mobile shell 210, web shell 220, and native desktop shell 230) so that application utilities 350 work consistently across different platforms.

Application data layer 360 generally stores data models and user data at a local device and delivers the data to a remote source. Data model 361 generally defines relationships between data objects that are used within an application. The definitions may include the names of variables, data types, and other information that defines a data object and the interactions between different data objects. Data store 362 may be a relational or non-relational database that stores user data according to one or more data models in data models 361. Caching mechanism 363 may orchestrate the transmission of data to a remote source for commitment to a remote database.

Foundation layer 370 generally includes modules that interact with device hardware and define the low-level behavior of a shell framework 305. As illustrated, foundation layer 370 includes a networking module 371, configuration module 372, resource loading module 373, and utilities module 374. Networking module 371 generally provides an interface through which an application executing within an application shell framework 305 communicates with other computing devices. This interface may include, for example, functions that convert data into a bitstream that may be encapsulated into one or more packets for transmission to another device via a network interface, such as a wired interface, an 802.11 wireless interface, a cellular wireless interface, or other data transfer interfaces. Configuration module 372 generally configures the shell framework 305 for execution on a specific device. Resource loading module 373 allows an application executing within an application shell to reserve resources (e.g., temporary and/or persistent memory, CPU time, etc.) on a device to allow for execution of the application. Utilities module 374 generally provides basic utilities that the shell framework 305 uses for error recovery, memory management, and other purposes.

As discussed above, widgets and plugins hosted within a shell framework 305 may interact with various services 380 through, for example, service integration module 342 in shell core 340. As illustrated, the services that support execution of applications within a shell framework 305 may include product-specific UI services 381, a plugin repository 382, an application programming interface (API) service 383, and data transfer services 384. Product-specific UI services 381 generally provide product-specific user interface data to an application executing in shell framework 305. As discussed in detail above, a shell framework 305 can interact with plugin repository 382 to retrieve the appropriate version of a plugin and the widgets identified in a plugin definition for rendering on a user device. During execution of an application, the application may invoke one or more functions of a remote processing system represented by API service 383, which defines the functions that can be invoked by the application, the required and optional data inputs, and the type of data returned in response to the function call (if any). To invoke a function exposed by API service 383, a data transfer service 384 may provide a gateway between the application executing on a client device and the API service. The gateway may receive a request from a client device, generate and invoke a function call based on the received request, receive data from API service 383, and return the received data to the client device on which the shell framework 305 is executing.

Example Shell Core

Figure 4:
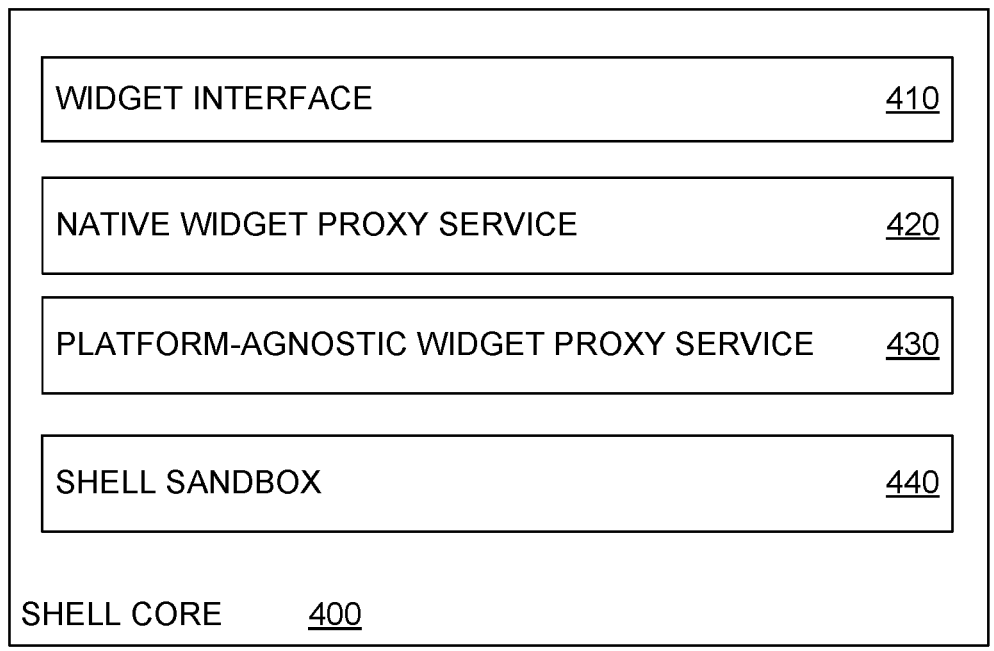
FIG. 4 illustrates an exemplary shell core that integrates native and web-based user interfaces on a mobile device, according to one embodiment.

FIG. 4 illustrates an exemplary shell core 400 which integrates native and web-based user interfaces on a mobile device. As illustrated in FIG. 4, shell core 400 generally includes a widget interface 410, a native widget proxy service 420, a platform-agnostic widget proxy service 430, and a shell sandbox 440.

The widget interface 410 may be used by an application on the client device to interact with widgets loaded into the shell core 400. The widget interface 410 may also provide the widgets loaded in the mobile shell access to functionality of the client device. For example, the widget interface 410 may provide access to a camera on the client device, a text to speech recognition function of the client device, a native animation function on the client device, and the like. The widget interface 410 may also provide access to the shell sandbox 440.

The native widget proxy service 420 provides an interface between one or more native widgets and the shell sandbox 440. The native widget proxy service 420 may monitor all communications to and from the native widgets. Monitoring communications of the native widgets enables the shell core 400 to maintain current data for activity logging and analytics.

The platform-agnostic widget proxy service 430 provides a runtime environment in which platform-agnostic widgets may execute. For example, the platform-agnostic widget proxy service 430 may provide a web browser-based runtime environment in which web-based widgets are executed and a framework-based runtime environment in which framework-based widgets are executed. The platform-agnostic widget proxy service 430 may also provide a communication bridge (not shown) through which all communications to and from a given platform-agnostic widget are routed. That is, the communication bridge may control communications between the given widget in the proxy and another widget (e.g., a native widget or a widget in another proxy). Although a widget executing in the platform-agnostic widget proxy service 430 can communicate directly with another widget executing in the same proxy 430, any communication between the widgets may be routed to the bridge so that the bridge can monitor and track all communications between widgets.

The platform-agnostic widget proxy service 430 may be initialized by the shell core 400 when a platform-agnostic widget is to be loaded. For example, if only native widgets are requested by the application (e.g., application 122 in FIG. 1), the platform-agnostic widget proxy service 430 may not be necessary to load the widgets in the mobile shell or for communications to and from the widgets. However, upon the application requesting a platform-agnostic widget, the shell core 400 may create the platform-agnostic widget proxy service 430 to host the platform-agnostic widget.

The shell sandbox 440 provides common services for widgets (e.g., native widgets and platform-agnostic widgets), such as activity logging, analytics, application context tracking, authentication, and the like. An instance of the shell sandbox 440 may be provided to each widget, whether a native widget or a platform-agnostic widget.

The platform-agnostic widget proxy service 430 may route all incoming communications to the shell sandbox 440 so that the shell sandbox 440 can update activity logs and analytics data for the widgets. The shell sandbox 440 enables integration of plugins and widgets built with different technologies (e.g., native widgets based on an operating system of the client device, web-based widgets, and framework-based widgets).

To load a platform-agnostic widget in the shell core 400, the application may provide information related to the platform-agnostic widget to the mobile shell. The information related to the widget may include at least a widget ID, a context, and initial properties of the widget. Each widget in the widget repository, such as widget repository 160 as shown in FIG. 1, may have a unique identifier (i.e., a widget ID). The widget ID may be used to identify a particular widget requested by the application. The context provided by the application may affect a behavior of the widget or how the widget is rendered by the application. The context may include at least one of a geographic location of the client device, a language currently used by the application, or a context of the user. Operations for loading a widget in the shell core 400 are discussed in more detail below, with respect to FIGS. 5-7.

Once a platform-agnostic widget is loaded, the shell core 400 may hydrate the widget. A widget may be hydrated by providing data stored in memory (e.g., widget repository 160 of FIG. 1) to the widget. For example, data relating to an authenticated session of the native application may be provided to the widget to transfer an authenticated session of the native application to the widget. That is, a user that is authenticated in the native application may not need to login when the widget is presented to the user. In the case of a web widget loaded into the shell core 400, the shell core 400 may translate the authentication from the application to into a representation to be used by the web browser in which the web widgets are executing. For example, the shell core 400 may provide authentication cookies (e.g., a key-value pair) to the web browser. A native widget may not require hydration because the shell core 400 may provide authentication credentials from the application directly to the native widget.

The application may request to unload a widget. Unloading a widget may comprise deallocating memory for that widget. For a platform-agnostic widget, the shell core 400 may deallocate memory reserved for that widget. However, the platform-agnostic widget proxy service 430 may remain in the mobile shell to be reused by another platform-agnostic widget. An unload request may be received from the application once the widget to be unloaded is no longer needed by the application. Operations for unloading a widget from the shell core 400 are discussed in more detail below with respect to FIGS. 5-7. As discussed above, dynamically unloading widgets when they are no longer needed by the application may lower the resource demand of a device executing the application, such as reducing the memory usage and processing necessary to manage all of the instantiated widgets.

Figure 5:
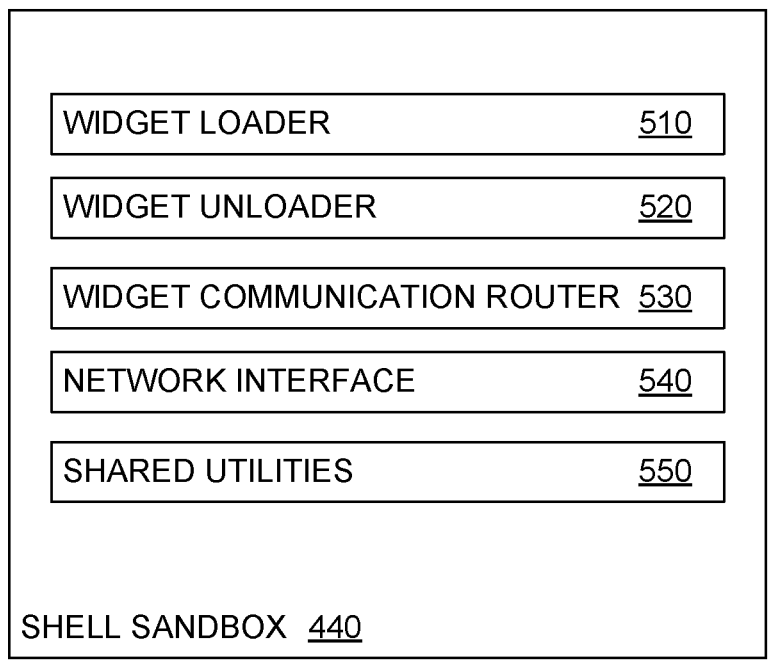
FIG. 5 illustrates an exemplary mobile shell sandbox that allows for seamless communication between native and platform-agnostic based widgets, according to one embodiment.

FIG. 5 illustrates an exemplary shell sandbox 440 that allows for communication between native and platform-agnostic widgets. As illustrated, the shell sandbox 440 includes a widget loader 510, a widget unloader 520, a widget communication router 530, a network interface 540, and shared utilities 550.

The widget loader 510 may receive a request from the application to load a particular widget into the mobile core (e.g., shell core 400 of FIG. 4). The request may include information related to the widget to be loaded, including a widget ID, a version, a context, and initial properties of the widget. The widget loader 510 may use the widget ID to determine a particular widget to be loaded from a widget repository (e.g., widget repository 160 in FIG. 1). Once loaded, the widget loader 510 may provide the context and initial properties to the widget. The initial properties of the widget may include any properties needed for the UI of the widget to be customized to the client device or the user of the device. For example, the initial properties may include at least a screen size of the client device, demographic data of the user, and the like.

If the widget to be loaded in the mobile shell is a platform-agnostic widget, the widget loader 510 may determine whether a platform-agnostic widget proxy service has previously been created in the mobile shell. If so, the mobile shell may load the platform-agnostic widget into that proxy. If not, the mobile shell creates the platform-agnostic widget proxy.

Prior to loading a widget, the widget loader 510 may communicate with the widget unloader 520. For example, the widget loader 510 may provide a type of widget to be loaded in the mobile shell to the widget unloader 520. If the type indicates that the widget to be loaded is a platform-agnostic widget, the widget unloader 520 may determine whether a platform-agnostic widget is currently loaded in the platform-agnostic widget proxy. If so, the widget unloader 520 may unload the currently loaded widget. Once unloaded, the widget loader 510 may load the other widget into the platform-agnostic widget proxy.

The widget unloader 520 may receive a request from the application to unload a widget from the mobile shell (e.g., mobile shell 210 of FIG. 2). To unload a widget, the widget unloader 520 may deallocate memory reserved for that widget. The widget unloader 520 may communicate to the widget loader 510 that the widget has been unloaded from the mobile shell.

The widget communication router 530 may route all communication to and from each widget loaded in the mobile shell. For example, the widget communication router 530 may route a message to a destination widget, the application, or an external third party. The message may be routed to the network interface 540 if the destination is an external third party.

The shared utilities 550 may provide access to shell services. The shell services may include activity logging, analytics, application context racking, authentication, and the like. To access these services, a widget may send an API request to the shell sandbox 440.

Figure 6:
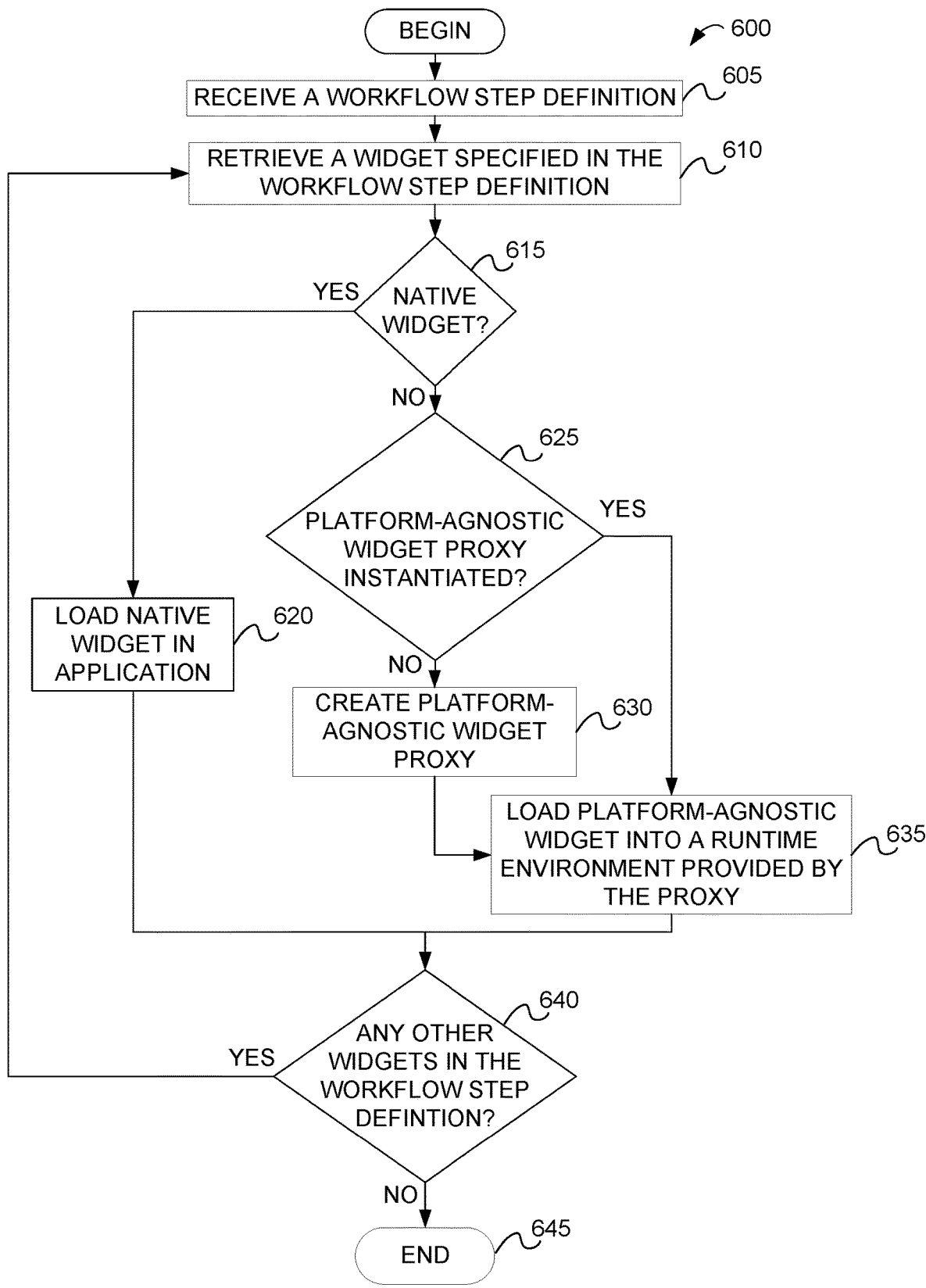
FIG. 6 illustrates a method for loading one or more widgets into a mobile shell based on widget type, according to one embodiment.

FIG. 6 illustrates a method 600 that may be executed by a shell core, such as shell core 400 in FIG. 4, to load one or more widgets specified in a workflow step definition into a mobile shell based on widget type (e.g., native or platform-agnostic). A native widget may be a widget built using code that is native to the platform on which the mobile shell is executing. A platform-agnostic widget may be built using code that is not native to the platform but compatible with the mobile shell.

Method 600 begins at step 605 where a shell core receives a workflow step definition. The workflow step definition may specify one or more widgets to be loaded by the shell core.

At step 610, the shell core retrieves a widget specified in the workflow step definition to be loaded in the mobile shell (but is not currently loaded in the mobile shell).

At step 615, the shell core determines whether the widget to be loaded is a native widget. A widget may be a native widget or a platform-agnostic widget such as a web-based widget or framework-based widget. The widget type may be determined based on a widget ID or other characteristic data associated with the widget. For example, the workflow step definition may include an indication of widget type.

If the widget to be loaded is a native widget, at step 615, the shell core loads the native widget directly into an application executing on a client device at step 620.

If the widget is not a native widget at step 615, the shell core determines whether a platform-agnostic widget proxy (e.g., platform-agnostic widget proxy service 430 in FIG. 4) has been instantiated at step 625. The platform-agnostic widget proxy may provide a runtime environment in which one or more platform-agnostic widgets may execute once loaded into the mobile shell.

If a platform-agnostic widget proxy has not been instantiated at step 625, the shell core creates the platform-agnostic widget proxy at step 630. Once the platform-agnostic widget proxy is instantiated, the platform-agnostic widget is loaded into the runtime environment provided by the proxy at step 635. If a platform-agnostic widget proxy has already been instantiated at step 625, then the method 600 moves directly to step 635 where the platform-agnostic widget is loaded into the runtime environment provided by the proxy.

At step 640, the shell core determines whether there are any other widgets in the workflow step definition to be loaded into the mobile shell. If so, the shell core returns to step 610 to retrieve the next widget specified in the workflow step definition. This process may repeat until all widgets specified in the workflow step definition have been loaded into the mobile shell.

The method 600 ends at step 645 once all widgets specified in the workflow step definition are loaded into the mobile shell.

In some instances, one or more widgets in the workflow step definition received at step 605 may have been previously loaded into the mobile shell according to a previously executed workflow step definition. In those instances, method 600 may proceed to load only those widgets specified by the workflow step definition that are not currently loaded. This may lead to performance improvements on the device implementing the application. For example, the total time taken to load the widgets specified in the workflow step definition may be beneficially reduced by not reloading already loaded widgets. This may further improve the utilization of device resources, such as processing cycles, memory usage, and network bandwidth. In yet other instances, method 600 may consider the age of the previously loaded widgets (e.g., via a timing function) and decide to load all widgets defined in a workflow step definition notwithstanding the existence of loaded widgets that match those in the received workflow step definition. In this latter case, the method 600 may seek to ensure that the most updated widgets (e.g., most recently updated) are loaded.

Figure 7:
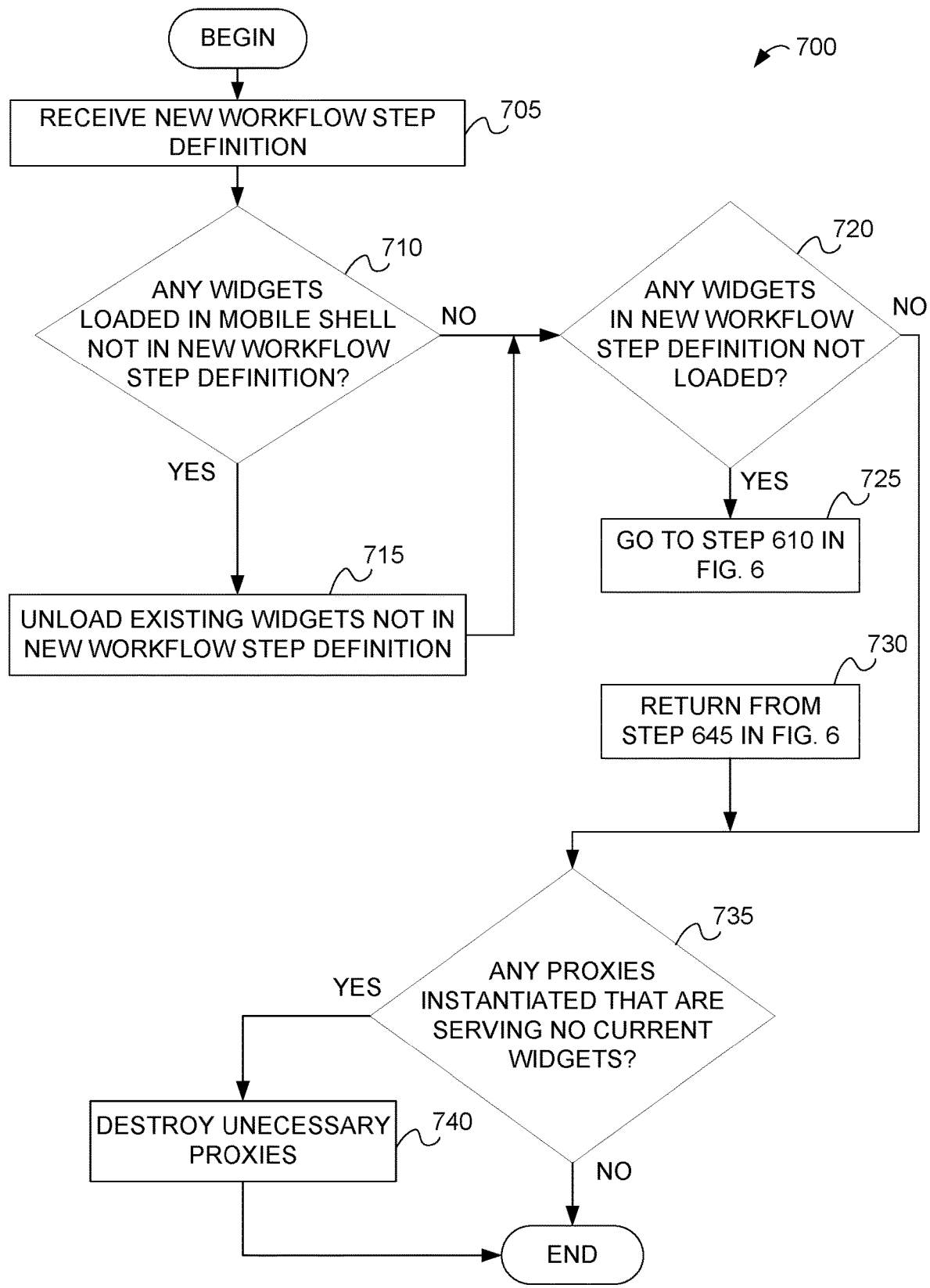
FIG. 7 illustrates a method for loading widgets from a new workflow step definition into the mobile shell, according to one embodiment.

FIG. 7 illustrates a method 700 that may be executed by a shell core, such as shell core 400 in FIG. 4, to load widgets from a new workflow step definition into a mobile shell (e.g., mobile shell 210 in FIG. 2). As shown, the method begins at step 705 where the shell core receives a new workflow step definition. The new workflow step definition may be received from an application executing on the client device and may specify one or more widgets to be loaded by the mobile shell. One or more of the widgets specified in the new workflow step definition may be the same widgets specified by a previous workflow step definition executed by the mobile shell.

At step 710, the shell core determines whether any widgets currently loaded in the mobile shell are not specified in the new workflow step definition. That is, the shell core determines whether a workflow step definition executed prior to the new workflow step definition specified any widgets other than the widgets specified in the new workflow step definition.

If there are widgets loaded in the mobile shell not specified in the new workflow step definition, at step 710, the mobile shell unloads those widgets from the mobile shell at step 715. A widget may be unloaded by deallocating memory reserved for that widget. In this way, resources of the device implementing the application, such as memory space, may be efficiently deallocated and made available for reuse by another widget.

If, at step 710, all widgets loaded in the mobile shell are specified in the new workflow step definition, the method proceeds to step 720.

At step 720, the mobile shell determines whether any widgets in the new workflow step definition are not currently loaded in the mobile shell.

If, at step 720, there are not any widgets in the new flow step definition not already loaded, then then method 700 moves to step 735. For example, where a previous workflow step definition included a set of widgets, and the new workflow step definition includes a subset of those widgets, some of the unloaded at step 715, but the remaining widgets may be comprehensive of those called for by the new workflow step definition.

If there are widgets in the new workflow step definition that are not yet loaded, at step 720, the method proceeds to step 725 where the mobile shell proceeds to load each widget in the new workflow step definition according to steps 610-645 of method 600.

Once the mobile shell has loaded each widget in the new workflow step definition (e.g., according to steps 610-645 of method 600), the method returns at step 730. The method 700 then proceeds to step 735 where the mobile shell determines whether any proxies (e.g., native widget proxy service 420 in FIG. 4 or platform-agnostic widget proxy service 430 in FIG. 4) are instantiated that are not serving any widgets currently loaded in the mobile shell for the current (i.e., new) workflow step definition. If there are proxies instantiated that are not being used by any loaded widgets, the mobile shell destroys those proxies at step 740. A proxy may be destroyed by deallocating memory reserved for the proxy. Here again, this proactive management of resources may improve the performance of the device, by, for example, releasing memory for use by other processes and saving processing resources that need not be dedicated to idle proxies.

Figure 8:
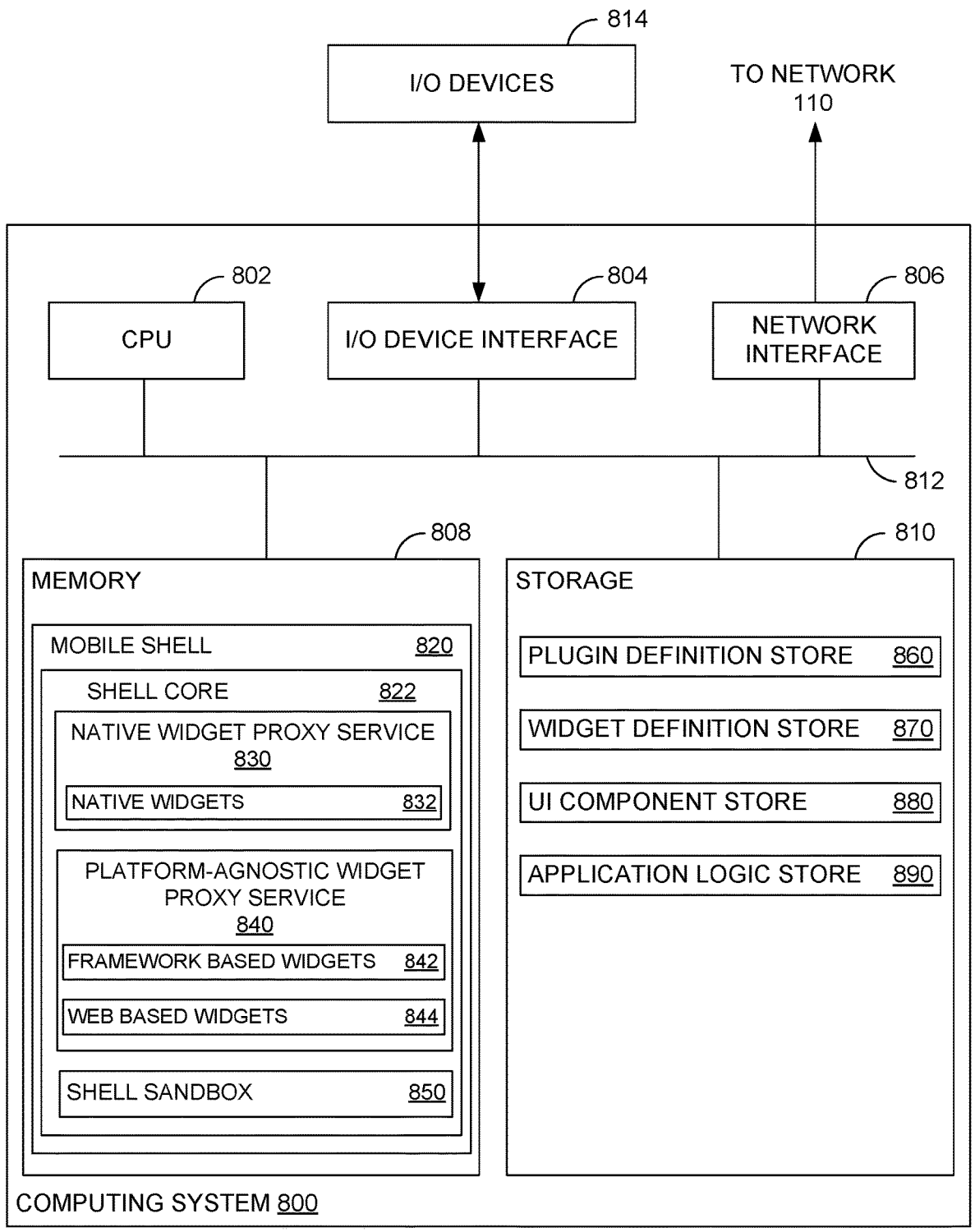
FIG. 8 illustrates an exemplary computing system for deploying cross-platform applications with native and mobile components on a mobile device, according to one embodiment.

FIG. 8 illustrates an exemplary computing system 800 for deploying cross-platform applications with native and mobile components on a mobile device. As shown, the system 800 includes a central processing unit (CPU) 802, one or more I/O device interfaces 804 which may allow for the connection of various I/O devices 814 (e.g., keyboards, displays, mouse devices, pen input, etc.) to the system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be a disk drive, solid state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes a mobile shell 820. As illustrated, the mobile shell 820 includes a shell core 822 which includes a native widget proxy service 830, a platform-agnostic widget proxy service 840, and a shell sandbox 850. A widget may define a collection of user interface components to be rendered on a device to complete a workflow step or to enable a user to input data into an application. The native widget proxy service 830 may include one or more native widgets 832. The platform-agnostic widget proxy service 840 may provide a runtime environment (not shown) in which one or more framework-based widgets 842 and one or more web-based widgets 844 may execute.

The shell sandbox 850 provides common services to native and platform-agnostic widgets. The common services may include activity logging, analytics, application context tracking, authentication, and the like. All communications to and from a widget may be routed to the shell sandbox 850. The shell sandbox 850 may route the each communication to a corresponding destination.

The shell sandbox 850 may also load and unload widgets (e.g., native widgets 832, framework-based widgets 842, and web-based widgets 844) from the mobile shell 820. For a native widget, the shell sandbox 850 may load the widget directly into the mobile shell 820. For a platform-agnostic widget (e.g., a framework-based widget 842 or a web-based widget 844), the shell sandbox 850 may create a platform-agnostic widget proxy service into which the widget is loaded. The platform-agnostic widget proxy service may provide a runtime environment in which the platform-agnostic widget executes.

As shown, storage 810 includes a plugin definition store 860, widget definition store 870, UI component store 880, and application logic store 890. The plugin definition store 860 may store plugin definitions defined for a specific task implemented in a workflow. Each plugin definition may define, for example, a collection of widgets that can be used to perform a specific task, a reference to one or more functions defined in application logic store 890 that the plugin invokes, and a current version of the plugin definition.

The widget definition store 870 generally stores data defining widgets that can be loaded into the mobile shell 820. Each widget stored in widget definition store 870 may be defined as a set of user interface components configured to perform a specific task.

The UI component store 880 generally stores data defining platform-agnostic and native user interface components that may be used by one or more widgets to display a user interface on a client device (e.g., client device 120 in FIG. 1). Widgets that do not implement platform specific functionality (i.e., platform-agnostic) may reference one or more UI components in UI component store 880, and the client device may render a user interface by retrieving UI component definition data from UI component store 880.

The application logic store 890 generally provides a versioned repository containing code contracts and other software artifacts for the functional code implementing the workflow processed by an application server (e.g., server computer 130 of FIG. 1) and displayed on a client device (e.g., client device 120 of FIG. 1). The code contracts and other software artifacts may provide a definition of required and optional inputs of a function that can be invoked through one or more plugins and the expected functionality of the function (e.g., what the function does with the provided data, whether the function returns data to be displayed on the client device for display and/or manipulation, and if so, the type of data returned by function).

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a processor; and
a memory comprising executable instructions, which, when executed by the processor, cause the system to perform a method, the method comprising:
    receiving, from a server, a first workflow step definition including a first widget to be loaded into an application shell;
    identifying that the first widget in the first workflow step definition is implemented using platform-agnostic code components; and
    loading the first widget into the application shell via a platform-agnostic widget proxy service by:
        determining whether the platform-agnostic widget proxy service is instantiated within the application shell;
        in response to a determination that the platform-agnostic widget proxy service is instantiated within the application shell: loading the first widget into a runtime environment provided by the platform-agnostic widget proxy service; and
        in response to an alternative determination that the platform-agnostic widget proxy service is not instantiated within the application shell:
            generating an instance of the platform-agnostic widget proxy service; and
            loading the first widget into a runtime environment provided by the instance of the platform-agnostic widget proxy service.

2. The system of claim 1, wherein the method further comprises:
receiving, from the server, a second workflow step definition including a set of widgets to be loaded into the application shell;
unloading the first widget included in the first workflow step definition from the application shell; and
loading the set of widgets included in the second workflow step definition into the application shell.

3. The system of claim 2, wherein in order to unload the first widget included in the first workflow step definition, the method further comprises:
determining that the instance of the platform-agnostic widget proxy service will not be used by any widget included in the second workflow step definition;
destroying the first widget to free memory occupied by the first widget; and
destroying the instance of the platform-agnostic widget proxy service to make memory occupied by the platform-agnostic widget proxy service available for reuse.

4. The system of claim 1, wherein the method further comprises:
receiving a message for transmission from the first widget to a second widget; and
transmitting the message to the second widget through the instance of the platform-agnostic widget proxy service.

5. The system of claim 1, wherein the method further comprises:
receiving a message for transmission to the first widget from the instance of the platform-agnostic widget proxy service; and
transmitting the message to the first widget.

6. The system of claim 1, wherein the platform-agnostic widget proxy service comprises a framework-based runtime environment in which framework-based components are executed.

7. A method for loading a cross-platform application having native code components and web-based code components in an application shell, comprising:
receiving, from a server, a first workflow step definition including a first widget to be loaded into an application shell;
identifying that the first widget in the first workflow step definition is implemented using web-based code components; and
loading the first widget into the application shell via a platform-agnostic widget proxy service by:
    determining that the platform-agnostic widget proxy service is not, instantiated within the application shell; and
    in response to the determining that the platform-agnostic widget proxy service is not instantiated within the application shell:
        generating an instance of the platform-agnostic widget proxy service; and
        loading the first widget into a runtime environment provided by the instance of the platform-agnostic widget proxy service.

8. The method of claim 7, further comprising:
receiving, from the server, a second workflow step definition including a set of widgets to be loaded into the application shell;
unloading the first widget included in the first workflow step definition from the application shell; and
loading the set of widgets included in the second workflow step definition into the application shell.

9. The method of claim 8, wherein unloading the first widget included in the first workflow step definition comprises:
determining that the instance of the platform-agnostic widget proxy service will not be used by any widget included in the second workflow step definition;
destroying the first widget to free memory occupied by the first widget; and
destroying the instance of the platform-agnostic widget proxy service to free memory occupied by the instance of the platform-agnostic widget proxy service.

10. The method of claim 7, further comprising:
receiving a message for transmission from the first widget to a second widget; and
transmitting the message to the second widget through the instance of the platform-agnostic widget proxy service.

11. The method of claim 7, further comprising:
receiving a message for transmission to the first widget from the instance of the platform-agnostic widget proxy service; and
transmitting the message to the first widget.

12. The method of claim 7, wherein the platform-agnostic widget proxy service comprises a web shell having a web browser-based runtime environment in which web-based components are executed.

13. The method of claim 7, wherein the platform-agnostic widget proxy service comprises a framework-based runtime environment in which framework-based components are executed.

14. A method for loading a cross-platform application having native code components and platform-agnostic code components in an application shell, comprising:
receiving, from a server, a first workflow step definition including a first widget to be loaded into an application shell;
identifying that the first widget in the first workflow step definition is implemented using platform-agnostic code components; and
loading the first widget into the application shell via a platform-agnostic widget proxy service by:
determining that the platform-agnostic widget proxy service is not instantiated within the application shell;
and
in response to the determining that the platform-agnostic widget proxy service is not instantiated within the application shell:
generating an instance of the platform-agnostic widget proxy service; and
loading the first widget into a runtime environment provided by the instance of the platform-agnostic widget proxy service.

15. The method of claim 14, further comprising:
receiving, from the server, a second workflow step definition including a set of widgets to be loaded into the application shell;
unloading the first widget included in the first workflow step definition from the application shell; and
loading the set of widgets included in the second workflow step definition into the application shell.

16. The method of claim 15, wherein unloading the first widget included in the first workflow step definition comprises:
determining that the instance of the platform-agnostic widget proxy service will not be used by any widget included in the second workflow step definition;
destroying the first widget to free memory occupied by the first widget; and
destroying the instance of the platform-agnostic widget proxy service to free memory occupied by the instance of the platform-agnostic widget proxy service.

17. The method of claim 14, further comprising:
receiving a message for transmission from the first widget to a second widget; and
transmitting the message to the second widget through the instance of the platform-agnostic widget proxy service.

18. The method of claim 14, further comprising:
receiving a message for transmission to the first widget from the instance of the platform-agnostic widget proxy service; and
transmitting the message to the first widget.

19. The method of claim 14, wherein the platform-agnostic widget proxy service comprises a web shell having a web browser-based runtime environment in which web-based components are executed.

20. The method of claim 14, wherein the platform-agnostic widget proxy service comprises a framework-based runtime environment in which framework-based components are executed.

* * * * *